(12) United States Patent
Beyda

(10) Patent No.: US 6,829,622 B2
(45) Date of Patent: Dec. 7, 2004

(54) APPARATUS AND METHOD FOR MOBILE DEVICE SYNCHRONIZATION

(75) Inventor: William J. Beyda, Cupertino, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 353 days.

(21) Appl. No.: 09/917,394

(22) Filed: Jul. 27, 2001

(65) Prior Publication Data

US 2003/0023619 A1 Jan. 30, 2003

(51) Int. Cl.⁷ .............................................. G06F 17/30
(52) U.S. Cl. ........................ 707/203; 707/1; 707/2; 707/4; 707/10; 707/100; 707/101
(58) Field of Search .......................... 707/1, 10, 100, 707/101, 201, 203, 2, 4; 709/204, 217, 236, 238, 248, 202, 224, 246, 249, 250; 705/2, 6, 8, 10, 29, 37, 40, 417; 711/105, 114, 131, 141, 143

(56) References Cited

U.S. PATENT DOCUMENTS

| | | |
|---|---|---|
| 5,327,555 A | 7/1994 | Anderson |
| 5,666,530 A | 9/1997 | Clark et al. |
| 5,727,202 A | 3/1998 | Kucala |
| 5,790,974 A | 8/1998 | Tognazzini |
| 5,832,489 A | 11/1998 | Kucala |
| 6,052,735 A | 4/2000 | Ulrich et al. |
| 6,243,705 B1 | 6/2001 | Kucala |
| 6,295,541 B1 * | 9/2001 | Bodnar et al. ............... 707/203 |

* cited by examiner

Primary Examiner—Shahid Alam
Assistant Examiner—Fred Ehichioya

(57) ABSTRACT

Many portable computing devices include data based applications such as schedules, contact managers, and the like, which can be synchronized with another computing device, such as a desktop computer, whereby the data on both synchronized devices are conformed. The present invention discloses a method and apparatus that allows such data to be selectively synchronized, wherein the user can specify, on a record-by-record basis, which other databases receive or synchronize with each record. The present invention allows multiple users to synchronize portable computers with the same desktop (or other) computer without necessarily sharing all of their synchronizable data.

14 Claims, 3 Drawing Sheets

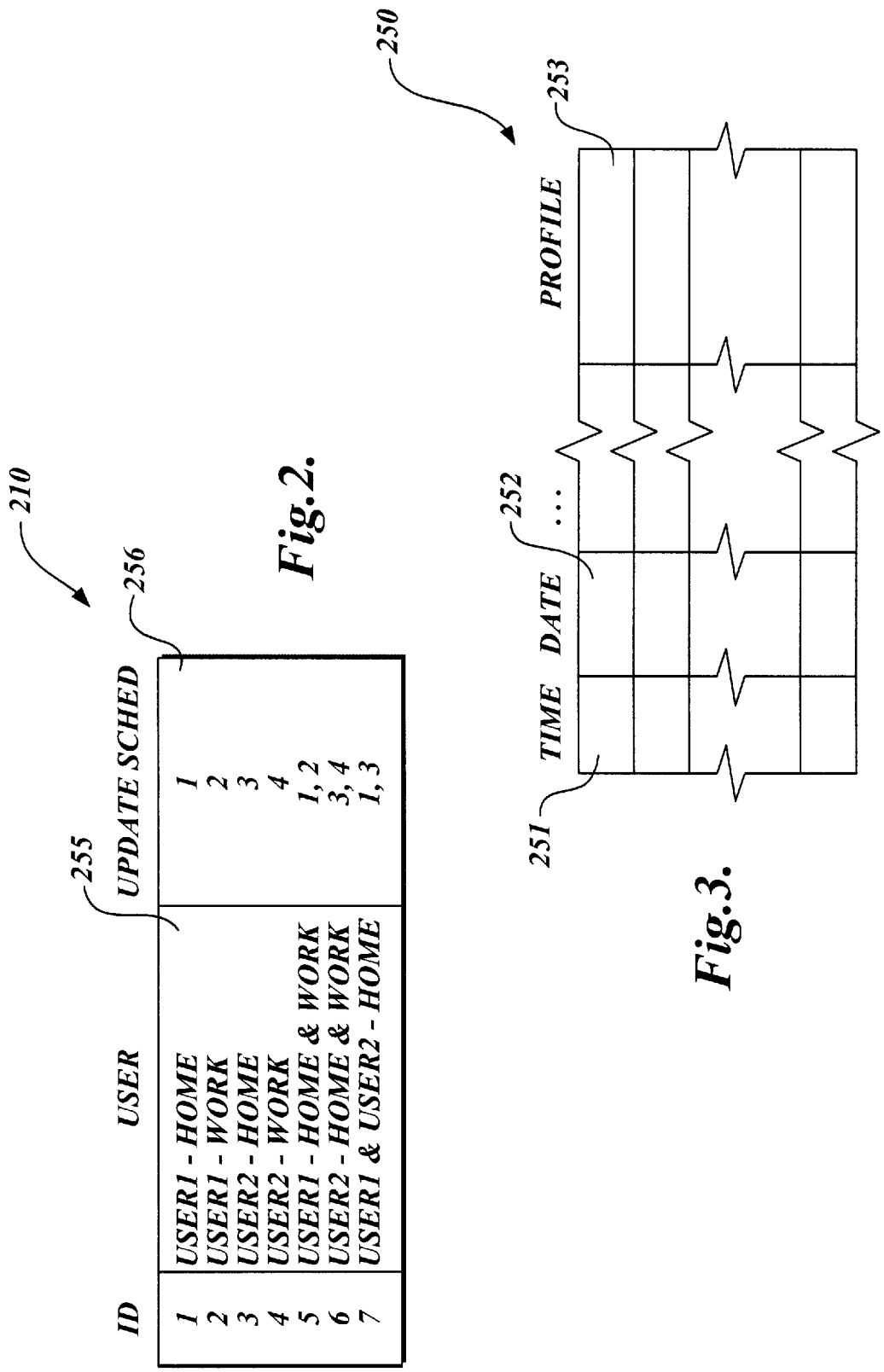

APPARATUS AND METHOD FOR MOBILE DEVICE SYNCHRONIZATION

FIELD OF THE INVENTION

The present invention relates to data synchronization technology and, more particularly, to methods for synchronizing data contained on portable computing devices.

BACKGROUND OF THE INVENTION

Over the last two decades, personal computers have evolved from a technically sophisticated tool used primarily by a relatively small number of engineers and scientists to a veritable appliance notable for its ubiquity in both the home and the office. As personal computers have penetrated into a growing number of homes and computer software has become easier to use, even as the technical sophistication of society has increased, a growing number of households have two or more members that use the home computer. Frequently one or more of these household members also use a separate personal computer at their workplace.

In addition to home and workplace personal computers, portable computing devices, such as laptop computers, palmtop computers, personal digital assistants (PDAs), and the like, are also gaining in popularity. Palmtop computers and PDAs are small hand-held computers that can be easily carried around by the user, for example in a pocket, purse or belt clip for ready access. Palmtop computers and PDAs typically include database software that maintains various data such as personal appointments and schedules, contact information, to-do lists and the like. These portable computing devices may also include input devices such as small keyboards or touch sensitive screens (with handwriting recognition software) to enable the user to enter data directly into the device. Additional features and applications for palmtops are available and under development, including by way of example, e-mail functionality, Web surfing capabilities, word processing, and spread sheet software, and even global positioning and mapping features.

Many of the most useful functions associated with palmtop computers and other portable computing devices, such as schedule, contact, and task management functions, are also available on desk top computers. These portable and desk-based systems utilize the same underlying data. It would be inconvenient to have to -4 manually enter this data on both a user's desk top computer and on a portable computing device. Moreover, such duplicative manual data entry would be subject to errors and inconsistencies. To avoid these disadvantages, synchronization software and hardware is generally available that automatically, or semi-automatically, conforms the data on the user's portable computing device with the data on the user's desk top computer or other primary computer system.

Synchronization software typically compares the data on one device with the data on the second device to identify differences, and updates the data on both devices, resolving data inconsistencies according to a preset priority algorithm. For example, some synchronization systems give precedence to the palmtop computer, copying all data from the palmtop computer to the desk top computer, without regard for the prior content on the desk top computer. Other methods use flags to identify records that have changed since the last synchronization, and update the changed records on the other device. Still other methods compare the data sets and prompt the user for input in reconciling changes. Another synchronization scheme maintains a separate file containing the data from the previous synchronization, and compares both the current desk top data set and the palmtop data set with the saved data set to identify the records that have changed. Examples of prior art synchronization methods are found, for example, in U.S. Pat. No. 6,243,705, No. 6,052,735, and No. 5,327,555.

Existing synchronization engines are designed to synchronize a single user to a single profile or data set on the desk top computer. This is a convenient method when a single user is the sole user of the desk top computer. However, if multiple persons are using the desk top computer, all of every users data may be combined in a single data set, which can become cumbersome and less useful. For example, a home computer may be used by several family members to maintain, for example, family-related schedule information. One or more of the family members may also have a palmtop computer that maintains the family member's work-related and family-related schedule information. If this family member synchronizes the palmtop computer with the home computer, then all of the work-related schedule information typically will be added to the home schedule data, which may not be desired.

Additionally, in the example above, the family member may have home-related schedule data that is relevant to only some of the remaining family members. If all family members also have palmtop computers, existing synchronization systems might copy the schedule data to all of the family members' palmtop schedules. This will result in irrelevant scheduling data on some of the family members' palmtop computers.

There is therefore a need for a data synchronization system that will allow multiple users to synchronize data selectively.

SUMMARY OF THE INVENTION

The present invention discloses a method and apparatus for selectively synchronizing computer-stored data sets, such as schedule data. The data sets may be disposed on different computers. The selective synchronization permits multiple users to each synchronize separate data sets from personal portable computing devices with a third data set on a shared computer, while only exporting from each personal device selected records and only importing into each personal device relevant records.

In an embodiment of the present invention, a user data structure identifying all of the relevant data sets is provided on each computer. The individual records in the data set each include a share field that contains data specifying which of the data sets are to synchronize with that record. When a first data set on one computer is synchronized with a second data set on another computer, the data sets will be updated such that new records in the first data set are added to the second data set only for new records wherein the corresponding share field specifies the second data set, and new records in the second data set are added to the first data set only for new records wherein the corresponding share field specifies the first data set. Similarly, in an aspect of the invention, modified records in the first data set will be updated in the second data set only for those records wherein the share field specifies the second data set.

In an aspect of the invention, the user data structure identifies the data sets if modifiable by the user, and when the first and second data sets are synchronized, the user data structure is synchronized prior to synchronizing the data sets.

In another aspect of the invention the data sets comprise schedule data records, such as time, date, duration, and the like for a plurality of schedule events.

In another aspect of the invention, at least one of the computers may be a palmtop computer.

In another aspect of the invention, a third data set is provided on a second portable computer, the first and third computers being selectively synchronizable with the second computer.

In an embodiment of the invention, an apparatus for selectively synchronizing a first and a second data set that each include a profile field identifying one or more of the data sets. This embodiment includes a first computer having a first user file containing user profile data identifying each data set and a first data file containing the first data set. A second computer includes a second user file containing user profile data identifying each data set and a second data file containing the second data set. A communications link for linking said first and second computers, and means for updating the first and second data sets with data from the other data set that is identified for the first and second data set.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 depicts an example of an embodiment according to the present invention of the profile table shown in FIG. 1.

FIG. 3 depicts a fragmentary portion of an embodiment of a data structure for the schedule shown in FIG. 1, according to the present invention.

DETAILED DESCRIPTION OF THE PREFERRED EMBODIMENT

Figure 1:
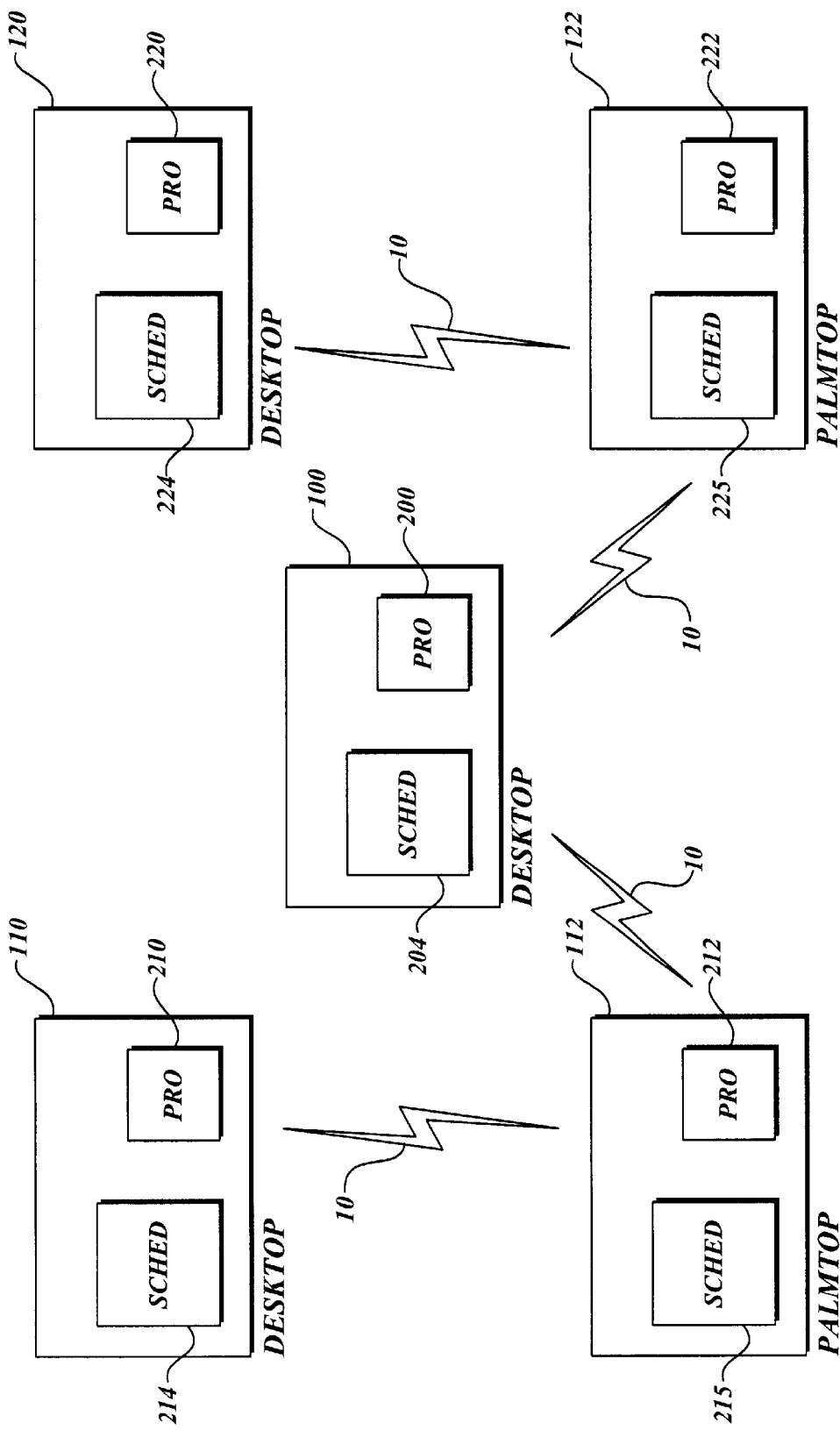
FIG. 1 is a schematic illustration of an example of the present invention applied to a situation wherein two users with portable computing devices have separate work computers and share a home computer.

An embodiment of the present invention will now be described in detail by reference to a particular example wherein a household computer 100 is shared by two users/family members, and the users also have workplace computers 110, 120 and palmtop computers 112, 122. FIG. 1 depicts schematically this collection of computers that are interrelated through the synchronization of the portable computing devices 112, 122 with the household computer 100, as discussed in more detail below. In this example, the first workplace computer 110 is the office computer for the first user and the second workplace computer 120 is the office computer for the second user. The first user's palmtop computer 112, and second user's palmtop computer 122 are also shown in FIG. 1. Synchronization connecting and communications systems 10 that permit synchronizing data between various computers are shown schematically with jagged lines 10 between the computing devices.

A user data set, or profile table, is provided on each computing device. The profile tables 200, 210, 212, 220, and 222 identify the users who will be considered during the synchronization of the palmtop computers 112, 122. It is contemplated that the profile tables may include various combinations or groups of individual users—for example, "all users," "user 1 and user 3," and the like. An example profile table 210 is shown in FIG. 2. The profile tables 200, 210, 212, 220, 222 include a user field that lists the users and groups that have been identified for the corresponding computer and an updated schedule field 255 that identifies each: user or group 255 in the profile table, which schedules are to be updated for that user or group.

Each of the computing devices 100, 110, 112, 120, 122 also have a data set stored in memory that is to be synchronized, which, for purposes of this example, are schedule data sets. Schedule data sets are well-known in the art and, although various formats and implementations may be utilized, a schedule data set typically includes a collection of records, each record having individual data fields that contain the parameters for each schedule event, such as date, time, duration, and the like. A fragmentary example of a data structure 250 for a schedule is shown in FIG. 3. The household computer 100 includes a schedule 204, the workplace computers 110, 120 include schedules 214, 224, and the palmtop computers 112, 122 include schedules 215, 225.

As best seen in FIG. 1, each of the palmtop computers 112, 122 can be synchronized 10 with one workplace computer 110 or 120, and with the household computer 100. In prior art systems, synchronizing the schedule data sets will update both the palmtop schedule and the desktop schedule using selected rules for resolving conflicts, such that the two schedules are generally identical after synchronization. Therefore, in a prior art system applied to the example computer network shown in FIG. 1, after synchronizing each palmtop computer 112, 122 with the respective work computer 110, 120 and then with the household computer 100, all of the schedules 204, 214, 215, 224, and 225 would contain identical data sets containing all of the schedule data for both users.

In the present invention, the individual schedule records (see FIG. 3) include a field or flag that indicates which of the users in the associated profile table are to have their schedules updated with the corresponding record data. For example, a user may enter a new schedule event or modify an existing schedule event in the first palmtop computer schedule 215, entering, for example, a time field entry 251, date field entry 252, and whatever other data is desired or required. The user would then select an entry for the profile field 253. In the preferred embodiment the user could select from one or more of the entries in the profile table 210 or do nothing to select a default profile. In this example, the user may select that the schedule event is for all users. When the first palmtop computer 112 is synchronized with the household computer 100, the household computer schedule 204 is updated to add the new schedule record or modify the existing schedule record. If the second user subsequently synchronizes the second palmtop computer 122 with the household computer 100, the second palmtop schedule 225 is updated to add the new or modified schedule record.

Alternatively (or additionally), if the first user enters a new schedule record in the first palmtop schedule 215 that is flagged to indicate it is only for the first user, then when the first palmtop computer 112 is synchronized with the household computer 100, the household computer schedule 204 is updated to include the new record. However, when the second user subsequently synchronizes the second palmtop computer 122 with the household computer 100, the new record will not be added to the second palmtop schedule 225.

It will be appreciated that the particular scheme used to resolve conflicts or differences between two schedules during synchronization is not important to, the present invention, and any prior art synchronization technology may be used. For example, the selected synchronization scheme may compare both schedules with an archived schedule data set from the last synchronization, to identify modified and new records, prompting the user for input in the case of a conflict between two modified or added records.

It is also contemplated that the synchronization profiles may be configured to discriminate between data for a user at home and the same user at work, treating the data as if the user was two different users. For example, if the first user adds a new schedule record on the first palmtop computer 112 that is flagged for the user at work, then that new record would not be incorporated into the household computer schedule 204 upon synchronization with the household computer 100. It will be appreciated that this scheme permits a user to synchronize the palmtop 112 both at home and at work without cluttering up the home schedule with work-related entries, and vice versa.

In the preferred embodiment the profile tables 200, 210, 212, 220, 222 may be modified by the local user from time to time. The profile tables are, however, likely to be short, and relatively static after the initial set up. Prior to initializing the schedule synchronization between any two computers, the profile tables may first be synchronized. If changes are found in one or both of the profile tables, then the schedule records may also be updated to reflect changes in the profile tables, as required.

Figure 4:
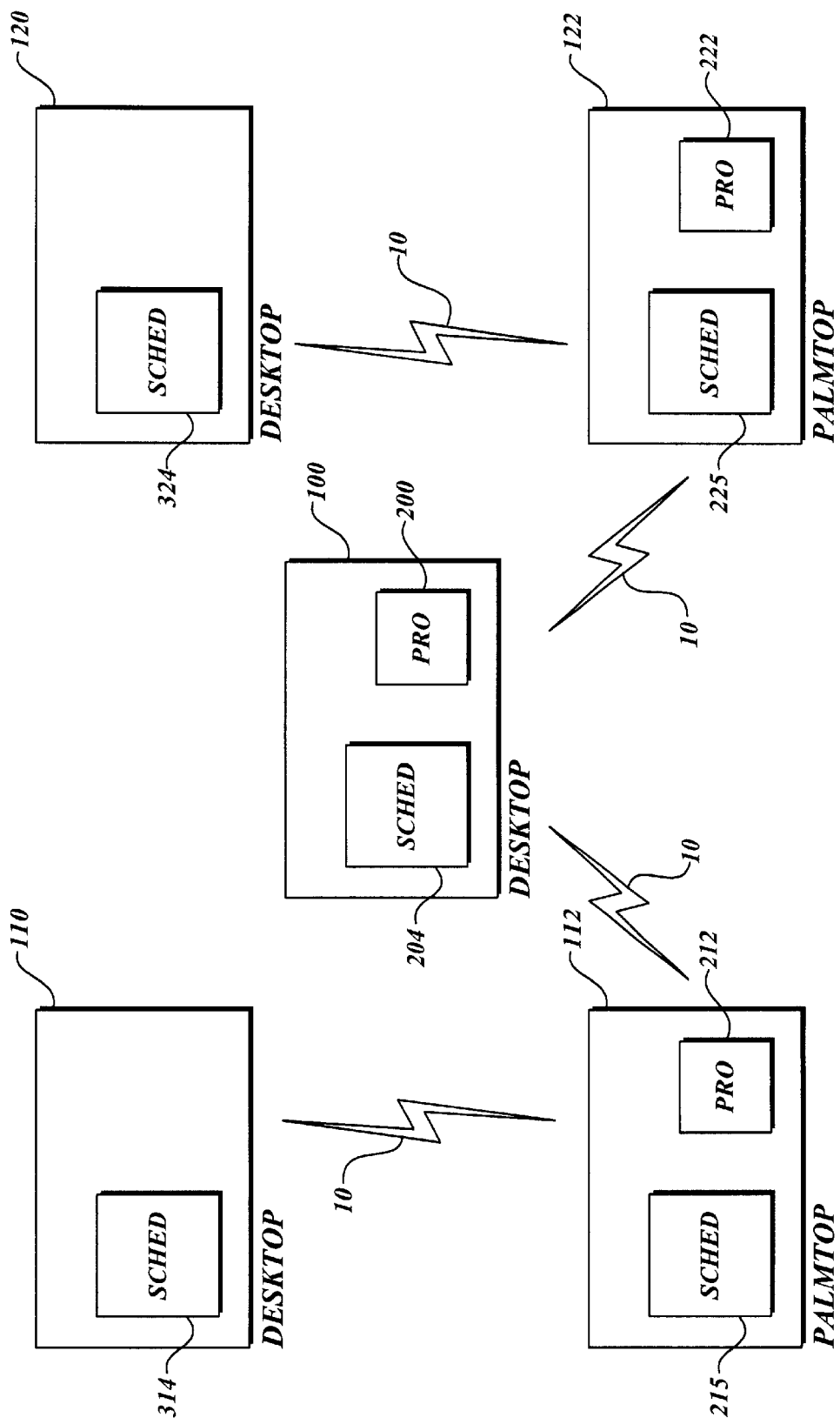
FIG. 4 is a schematic illustration of a second embodiment of the present invention applied to a situation wherein two users with portable computing devices have separate work computers and share a home computer.

FIG. 4 shows an example of the present invention in an alternative embodiment, again in the context of the context of two users, wherein each user accesses a work computer 110, 120 and a palmtop computer 112, 122, and both users share a household computer 100. In this example conventional schedules 314, 324 without a profile field are maintained on the work computers 110, 120. Schedules 204, 215, and 225 on the household computer 100 and the palm top computers 112, 122 are maintained with a profile field as discussed above. The profile tables 200, 212, 222 are also maintained only on the household computer 100 and the palmtop computers 112, 122.

When a palmtop computer 112, 122 is synchronized with the corresponding workplace computer 110, 120 the synchronization occurs in a conventional manner by any suitable synchronization scheme. After synchronization of the schedules, for example, schedules 314 and 215, which is done without taking into account any of the profile data, the schedules 314, 215 would therefore typically be identical.

During synchronization with the home computer 100 however the profile data will be utilized as discussed above. If the default setting for the profile field is to not update the household computer 100 then any schedule records entered on a workplace computer 110, 120 and synchronized into the corresponding palmtop computer 112, 122 will not by default be synchronized into the household computer 100. The user can manually modify the schedule record on the palmtop computer 112, 122 to change the default profile field, if desired. When entering or editing schedule data records in the palmtop computer 112, 122 the user will have the option of specifying from the profile table 212, 222 which users are to receive the schedule data. Upon synchronization 10 with the household computer 100, the palmtop schedules 215, 225 and household computer schedule 204 will be updated as discussed above. An advantage of this second embodiment is that the profile tables do not need to be maintained on the workplace computers 110, 120.

Although the embodiments disclosed above have been described with reference to schedule data, it will be apparent to one of ordinary skill in the art, and it is contemplated by the applicant, that the invention is readily applicable to other types of data sets including, for example, contact data sets, task management data sets, and the like. Also, although the conceptual framework utilizing tables, records and fields have been disclosed, it is also within the skill in the art to implement the disclosed invention utilizing other data structures. It is also contemplated by the present invention that other portable computing devices, such as personal digital assistants and the like, may be utilized instead of, or in addition to, the palmtop computers described above. Moreover, it is to be understood that at least some of the selectively synchronizable data sets may be stored directly on the corresponding computing device or stored on a device accessible to the computing device as, for example, over a network.

While the preferred embodiment of the invention has been illustrated and described, it will be appreciated that various changes can be made therein without departing from the scope of the invention. It is therefore intended that the scope of the invention be determined from the following claims and equivalents thereto.

The embodiments of the invention in which an exclusive property or privilege is claimed are defined as follows:

1. A method for selectively synchronizing a first data set with a compatible second data set, each data set having a plurality of records, the method comprising:

creating a first user data structure identifying a plurality of data sets including the first and second data sets, the first user data structure also identifying combinations of the plurality of data sets;

including a share field in each of the plurality of records;

for each of the plurality of records, identifying in the share field one or more data sets for synchronizing by selecting from the first user data structure one or more of the plurality of data sets; and selectively synchronizing the first data set and the second data set by identifying new records in the first data set and adding the identified new records to the second data set only for new records having a share field that specifies the second data set, and identifying new records in the second data set and adding the identified new records to the first data set only for new records having a share field that specifies the first data set;

wherein after selectively synchronizing the first data set and the second data set the first and second data sets do not necessarily have a one-to-one record correspondence.

2. The method of claim 1, wherein the first data set is disposed on a first computing device and the second data set is disposed on a second computing device.

3. The method of claim 2, wherein the first user data structure is disposed on the first computing device and a second user data structure is disposed on the second computing device, the method further comprising synchronizing the data in the first user data structure with the data in the second user data structure prior to updating the first and/or second data sets.

4. The method of claim 3, wherein the first and second data sets comprise schedule data.

5. The method of claim 3, wherein the first and second data structures comprise data tables listing the plurality of data sets with information specifying the logical location of the data sets.

6. The method of claim 3, wherein at least one of the first and second computing devices is a palmtop computer.

7. The method of claim 3, wherein at least one of the first and second computing devices is a personal digital assistant.

8. A method for selectively synchronizing a plurality of data sets, each data set having a plurality of records, the method comprising:

creating a user data structure having a list of the plurality of data sets, the user data structure also identifying combinations of the plurality of data sets;

including a share field in each of the plurality of records and identifying in the share field one or more data sets for synchronizing by selecting from the user data structure one or more of the plurality of data sets;

selecting a first data set and a second data set from the plurality of data sets;

updating the first data set an the second data set such that new records in the first data set are added to the second data set only for new records wherein the corresponding share field specifies the second data set, and new records in the second data set are added to the first data set only for new records wherein the corresponding share field specifies the first data set;

selecting a third data set from the plurality of data sets; and updating the first data set and the third data set such that new records in the first data set are added to the third data set only for new records wherein the corresponding share field specifies the third data set, and new records in the third data set are added to the first data set only for new records wherein the corresponding share field specifies the first data set;

wherein after selective synchronization the records of the first data set and the records of the second data set and the records of the third data set do not necessarily have a one-to-one correspondence.

9. The method of claim 8, wherein the first data set is disposed on a first computing device, the second data set is disposed on a second computing device, and the third data set is disposed on a third computing device.

10. The method of claim 9, wherein the user data structure is disposed on the first computing device, a second user data structure is disposed on the second computing device, and a third data user structure is disposed on the third computing device, the method further comprising synchronizing the data in the first user data structure with the data in the second user data structure prior to updating the first and second data sets.

11. The method of claim 10 wherein the first, second and third data sets comprise schedule data.

12. The method of claim 10, wherein the first and second data structures comprise data tables listing the plurality of data sets with information specifying the logical location of the data sets.

13. The method of claim 10, wherein at least one of the first and second computing devices is a palmtop computer.

14. The method of claim 10, wherein at least one of the first and second computing devices is a personal digital assistant.

* * * * *